July 10, 1956     K. A. OSTERBERG     2,753,653
FISHING SINKER
Filed April 28, 1952
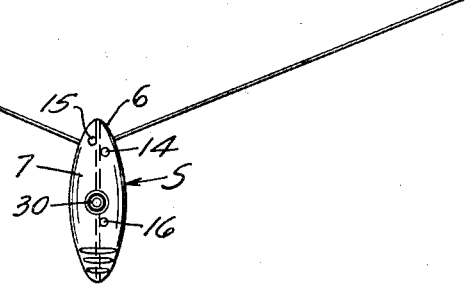
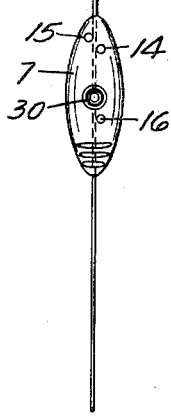
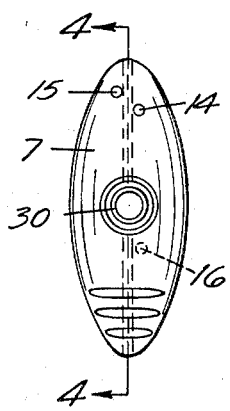
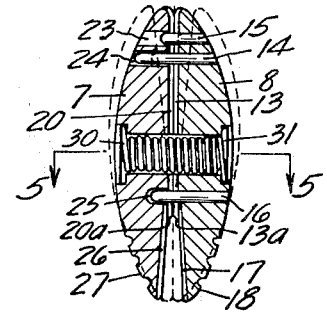
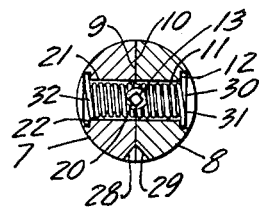
INVENTOR
KENNETH A. OSTERBERG
BY Williamson, Williamson, Schroeder & Adams
ATTORNEYS

2,753,653
FISHING SINKER
Kenneth A. Osterberg, Minneapolis, Minn.

Application April 28, 1952, Serial No. 284,759

4 Claims. (Cl. 43—44.91)

This invention relates to sinkers for fish lines. More particularly, it relates to sinkers for fish lines of the adjustable type.

An object of my invention is to provide a sinker for fish lines capable of being used to hang plumb on the fish line or in pendant style and of being quickly and easily attached or detached from the fish line for either type fishing with a minimum of time consumption.

Another object is to provide a sinker which may quickly and easily have its manner of use changed from plumb to pendant style or vice versa and which is constructed so that repeated changes of this nature will not cause any appreciable weakening or wear of portions of the sinker.

Another object is to provide a sinker readily adjustable to be moved along the length of the line whether used in plumb or pendant style and without performing any structural adjustment or manipulations to the parts of the sinker.

Another object is to provide a sinker which, when used in plumb style, will hang perfectly vertically with the fish line extending along the true longitudinal center of the sinker throughout the length of the sinker.

Another object is to provide a sinker which will accommodate any of the conventional sized fish lines.

Another object is to provide a sinker having a substantially symmetrical body, the forward portions of which are smooth and rounded and tapered to eliminate obstructions and projections and hence make the sinker weedless.

These and other objects and advantages of my invention will more fully appear from the following description made in connection with the accompanying drawings, wherein like reference characters refer to the same or similar parts throughout the several views, and in which:

Fig. 1 is a side elevational view of one embodiment of my invention shown hanging on a fish line in pendant style;

Fig. 2 is a side elevational view of a similar sinker hanging plumb upon the fish line;

Fig. 3 is a side elevational view of the same sinker on an enlarged scale and shown detached from the line;

Fig. 4 is a sectional view taken along line 4—4 of Fig. 3; and

Fig. 5 is a cross sectional view taken along line 5—5 of Fig. 4, the spring being shown in elevation.

One embodiment of my invention may include, as shown in Figs. 1–5, a substantially symmetrically formed body indicated generally as S, formed preferably of lead with approximately nine per cent antimony mixed therewith in order to provide the body with the desired amount of hardness. As shown in Figs. 1–5, the body S tapers at its extremities and the forward end portion 6 is rounded and smooth to eliminate obstructions and projections therefrom and hence make the sinker weedless.

As best shown in Figs. 4 and 5, the symmetrical body S is comprised of two substantially symmetrical half portions, one 7 of which, for the sake of clarity, will be referred to as the upper half, and the other 8 of which will be referred to as the lower half portion. As shown in these two views both the upper and the lower half portions 7 and 8 lie adjacent each other in side by side relationship and have flat registering surfaces 9 and 10 which are complementary to each other. The flat surface 10 of the lower half portion 8 has a transversely extending aperture 11 which extends through its medial portion normal to its length and to its flat surface. The outer end portion of the aperture 11 is enlarged to form a shoulder 12 just inwardly of the outer surface of that half portion. As will be noted by referring to Fig. 4 each of the half portions 7 and 8 are elongated elements and as will be seen hereinafter may be described as clamp elements since they serve to clamp the fish line between each other.

Formed within the flat surface 10 of the lower half portion 8 is a longitudinally extending groove or guideway 13 which extends along the center of that half portion and from one end thereof to the other. Extending from this flat surface 10 toward the registering surface 9 of the upper half portion 7 is an abutment or guide pin 14. As shown in Figs. 1–3 this guide pin extends into the registering surface 9 a sufficient distance so that the outer end thereof is at all times disposed within the body of the top half portion 7. Also extending from the flat surface 10 of the lower half portion 8 is a lock pin 15. This lock pin extends into the upper half portion 7 but swings clear thereof when the forward ends of the two half portions are separated. This lock pin 15 is disposed on the opposite side of the groove 13 relative to the position of the guide pin 14 and is disposed forwardly of the guide pin. Extending from the flat surface 10 adjacent the rear end portion of the half 8 is a centering post 16 which extends from the side into the body of the half portion 7 and acts as a fulcrum for that half portion. The rear end portion of the lower half 8 has its inner flat surface cut away as at 17 and its exterior is provided with a plurality of transverse ribs 18 which provide a grip for the fisherman.

The upper half portion 7 has a similar and oppositely disposed groove 20 relative to the groove 13. The grooves 13 and 20 extend the full length of the half portions 7 and 8 and the portions of each half which define the groove are tapered as at 13a and 20a so as not to bind or cut the fish line when it lies within the grooves. This upper half portion 7 also has a transversely extending aperture 21 with a similarly formed shoulder 22. A passage 23 receives the lock pin 15 therein and a passage 24 receives the guide pin. A socket 25 accommodates the centering post or fulcrum 16. The rear area of the half portion 7 has its flat surface cut away similar to cut 17 in portion 8 as at 26 and is provided with a plurality of outstanding ribs 27.

Each of the half portions 7 and 8 is beveled along its side edges as at 28 and 29 to facilitate the insertion of a fish line therebetween. These two half portions are connected together and have their flat registering surfaces resiliently urged toward each other by a tensioned coiled spring 30, the outer ends 31 and 32 of which are spread so as to have a greater diameter and so as to engage the shoulders 12 and 22. In this manner the spring 30 constantly urges the two half portions 7 and 8 toward each other in a resilient but yieldable manner.

In manufacturing this sinker the upper and lower halves 7 and 8 are molded in the shapes shown by pressure molding. To assemble the sinker the upper and lower half portions 7 and 8 are placed in side by side relationship so that the guide pin 14, the lock pin 15 and the centering post 16 each extend into their respective recesses. The spring 30 is manufactured with one of its extreme ends expanded so as to engage one of the shoulders of the half portions. This spring is slid through the two apertures 11 and 21 of the two half portions and the smaller end is drawn therethrough and then spread so as to engage the respective shoulder of the particular half portion it extends through. In this manner it is possible to manufacture this sinker at an extremely low cost and in very large numbers with a minimum of time consumption and expense.

In use, if the sinker is desired to be used in pendant style as shown in Fig. 1, the rear end portions are merely forced together by applying pressure to the ribs 18 and 27 whereupon the two half portions 7 and 8 will pivot and the lock pin 15 will swing clear of the upper half portion 7 as shown in broken lines in Fig. 4. The fish line may then be slid inwardly from the forward end of the sinker until it abuts against the guide pin 14, the outer end of which still remains within the upper half portion 7. By releasing the rear end portions the forward end portions of the sinker will again move toward closed position and the lock pin 15 will lock the line between itself and the guide pin 14 so that the sinker will engage the line frictionally and hang upon the line as shown in Fig. 1. It is an easy matter whenever it is desired to do so, to adjust the position of the sinker along the length of the line by sliding the sinker in the desired direction.

If it is desired to attach the sinker to the line in plumb style as shown in Fig. 2, it is readily accomplished by pressing the rear end portions together and placing the line between the guide pin 14 and the lock post 15. The rear end portions are then released and the forward end portions of the sinker will move together to lock the fish line between the two posts at the forward end. Thereafter the line is drawn along the sides of the two half portions 7 and 8 into the beveled portion at 28 and 29 and drawn toward the center of the sinker. By pulling on the line toward the center and between the rear end portions the spring 30 is caused to yield slightly and the fish line will readily move into the grooves 13 and 20 and will extend along the length of the grooves and longitudinally of the sinker so that the sinker will hang at true plumb as shown in Fig. 2 with the line passing through the true center of the sinker and being frictionally engaged thereby. It should be noted that when the line is so positioned it not only lies within the grooves 13 and 20 but also passes directly through the spring 30, and that the portions of the spring 30 adjacent the flat registering surfaces 9 and 10 positively engage the line and tend to prevent the same from movement with respect to the sinker.

When it is desired to move the sinker longitudinally of the line when attached in the position shown in Fig. 2, it can be readily accomplished by merely sliding the sinker along the length of the line to the desired position. It is not even necessary to press the rear end portions of the sinker to accomplish this adjustment and yet the line is firmly held frictionally by the sinker after the adjustment is made. Thus it can be seen that there is no need to weaken the structure of the sinker itself to accomplish this adjustment as is so often the case in the more commonly known lead sinkers wherein a portion thereof is folded over and around the line to clamp the sinker to the line. In such cases the folded-over portion must be moved away from the main portion of the sinker in order to loosen the line to permit adjustment of the sinker along the length of the line.

Thus it can be seen that I have provided a novel and improved sinker for fish lines which functions in an improved manner and yet is capable as a practical matter of manufacture in large quantities at a very low cost. These sinkers are not only easy to manufacture but are also simple to assemble. Most important, however, is the improved manner in which the sinker functions for the sinker is capable of being used in either pendant or plumb style as described above without any adjustment to the parts thereof and without and excessive wear being applied to such parts. It can be readily seen that my sinker can be attached or detached relative to the line as often as desired with a minimum of time consumption and effort. Moreover, there is substantially no possibility that the sinker will be pulled off the line if an object is struck therewith. In addition, there is very little opportunity for weeds and the like to accumulate on the sinker. The grooves are of such size as to accommodate any conventional size line. The grooves at the center of the sinker automatically center the same when the line is aligned therewith. The shape of the two moldings or half portions 7 and 8 are such as to permit the sinker to pass through the water with a minimum of disturbance. Its elongated, oval and symmetrical shape create a minimum of disturbance in the water when the sinker is drawn therethrough.

It will, of course, be understood that various changes may be made in the form, details, arrangement and proportions of the various parts without departing from the scope of my invention.

What is claimed is:

1. A sinker for fish lines comprising a symmetrical, weight-body composed of two sections of generally similar shape having rounded exteriors and opposed, inner gripping surfaces, a resilient member medially interconnecting said sections and yieldingly urging said opposed surfaces together, said body being at least somewhat elongated with its longitudinal axis lying medially between said sections, corresponding portions of said sections extending to the corresponding ends being spaced apart at opposed surfaces to permit relative swinging apart of the opposite ends of said sections when said spaced corresponding portions are pressed toward each other, guide means adjacent said spaced apart portions of said sections to confine a line in longitudinal axial alignment within said body, an abutment disposed at one side of the longitudinal axis of said body and fixed to one of said opposed surfaces adjacent said opposite ends, and a relatively short lock pin extending normal to one of said opposed surfaces and fixed thereto adjacent said opposite ends, said lock pin being disposed on the opposite side of the longitudinal axis of said body from the positioning of said abutment and the other of said sections having a recess for normally accommodating said lock pin, the swinging apart of said sections releasing said lock pin to permit a line to be moved thereover for positioning concentric with said longitudinal axis when the sections are spread apart and said resilient member permitting reception and gripping of said line along said longitudinal axis and in said guide means.

2. The structure set forth in claim 1 wherein said sections have corresponding longitudinal edges at the side of said body in close proximity to said lock pin which are oppositely beveled to facilitate forced lateral insertion of said line and spreading of said sections to facilitate ultimate positioning and gripping of a line at the longitudinal axis of said body.

3. A sinker for fish lines comprising a symmetrical, somewhat elongated, weight-body composed of two elongated sections generally similarly shaped having rounded exteriors and opposed inner gripping surfaces, a coil spring transversely passing through the medial portions of said sections and yieldably connecting said sections and urging said opposed gripping surfaces together, said spring having a spiral convolution thereof extending across the longitudinal axis of said body, and cooperating line-guiding means above and below the medial positioning of said coil spring and adapted to retain a line in the longitudinal center of said body, said spiral convolution then engaging said line and cooperating with the immediate adjacent gripping surfaces to frictionally retain the body in a desired adjusted position.

4. A sinker for fish lines comprising a symmetrical, somewhat elongated, weight-body composed of two sections generally similarly shaped having rounded exteriors and opposed inner gripping surfaces, a coil spring transversely passing through the medial portions of said sections and yieldably connecting said sections and urging said opposed gripping surfaces together, said spring having a spiral convolution thereof extending at the approximate longitudinal axis of said body, cooperating line-guiding means above and below the medial positioning of said coil spring and adapted to retain a line in the longitudinal center of said body, said spiral convolution then engaging said line and cooperating with the immediate adjacent gripping surfaces to frictionally retain the body in a desired adjusted position, corresponding portions of said sections extending to the corresponding extremities being spaced apart at opposed surfaces to permit relative swinging apart of the opposite ends of said sections, and a fulcrum member carried by one of said sections close to the position of said coil spring to facilitate swinging apart of said ends and thereby facilitate the movement of a line into a grippable position between said sections and whereafter when the sections are released, the line will be gripped and may therefore be laterally manually forced between said sections and into frictional engagement with the said spiral convolution of said spring at the longitudinal center line.

References Cited in the file of this patent

UNITED STATES PATENTS

| | | |
|---|---|---|
| 1,088,553 | Dostal | Feb. 24, 1914 |
| 1,176,631 | Wells | Mar. 21, 1916 |
| 1,259,664 | Peters | Mar. 19, 1918 |
| 2,241,851 | Gilstrap | May 13, 1941 |
| 2,406,252 | Potter | Aug. 6, 1946 |
| 2,461,833 | Mercier | Feb. 15, 1949 |

FOREIGN PATENTS

| | | |
|---|---|---|
| 118,458 | Australia | May 11, 1944 |